(12) United States Patent
Miyajima et al.

(10) Patent No.: US 11,409,006 B2
(45) Date of Patent: Aug. 9, 2022

(54) AZIMUTH ESTIMATION DEVICE

(71) Applicants: DENSO CORPORATION, Kariya (JP); TOYOTA JIDOSHA KABUSHIKI KAISHA, Toyota (JP)

(72) Inventors: Akira Miyajima, Kariya (JP); Katsuhiro Matsuoka, Nagakute (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 16/730,509

(22) Filed: Dec. 30, 2019

(65) Prior Publication Data

US 2020/0150284 A1 May 14, 2020

Related U.S. Application Data

(63) Continuation of application No. PCT/JP2018/023807, filed on Jun. 22, 2018.

(30) Foreign Application Priority Data

Jul. 12, 2017 (JP) .............................. JP2017-136433

(51) Int. Cl.
*G01S 19/49* (2010.01)
*G01S 19/53* (2010.01)

(52) U.S. Cl.
CPC .............. *G01S 19/49* (2013.01); *G01S 19/53* (2013.01)

(58) Field of Classification Search
CPC .......... G01S 19/26; G01S 19/29; G01S 19/47; G01S 19/49; G01S 19/53
See application file for complete search history.

(56) References Cited

U.S. PATENT DOCUMENTS 5,276,451 A * 1/1994 Odagawa ................ G01S 19/49
342/357.32
5,974,359 A 10/1999 Ohkubo
(Continued)

FOREIGN PATENT DOCUMENTS

JP        H1062194 A    3/1998
JP      2007206010 A    8/2007
(Continued)

OTHER PUBLICATIONS

U.S. Appl. No. 16/730,483, filed Dec. 30, 2019, Miyajima et al.

*Primary Examiner* — Cassi J Galt
(74) *Attorney, Agent, or Firm* — Harness, Dickey & Pierce, P.L.C.

(57) ABSTRACT

An azimuth estimation device includes a satellite data acquisition unit that acquires Doppler shift frequencies of navigation signals, a sensor data acquisition unit that acquires a yaw rate from a yaw rate sensor, a Doppler azimuth estimation unit that estimates an azimuth of a moving object, a state variable determination unit that determines a state variable indicating reliability of an azimuth angle, a threshold selection unit that selects, from plural evaluation parameter threshold groups for determining whether to adopt the azimuth as a reference azimuth, one of the evaluation parameter threshold groups, an evaluation parameter calculation unit that calculates plural evaluation parameters for evaluating reliability of an azimuth, and an adopting determination unit that compares the plural evaluation parameters with the evaluation parameter threshold group, and based on determination that an adopting condition is satisfied, determines adoption of the azimuth as the reference azimuth.

8 Claims, 5 Drawing Sheets

(56) References Cited

U.S. PATENT DOCUMENTS

| | | | |
|---|---|---|---|
| 2007/0257837 A1* | 11/2007 | Watanabe | ............... G01S 19/49 342/357.37 |
| 2011/0235686 A1 | 9/2011 | Kojima et al. | |
| 2011/0320122 A1 | 12/2011 | Oohashi et al. | |
| 2011/0320155 A1 | 12/2011 | Oohashi et al. | |
| 2011/0320156 A1 | 12/2011 | Oohashi et al. | |
| 2018/0172841 A1 | 6/2018 | Miyajima et al. | |

FOREIGN PATENT DOCUMENTS

| | | | |
|---|---|---|---|
| JP | 2011209268 A | | 10/2011 |
| JP | 20127939 A | | 1/2012 |
| JP | 2013113789 A | * | 6/2013 |
| JP | 5879977 B2 | | 3/2016 |
| JP | 2016147522 A | | 8/2016 |
| JP | 20179294 A | | 1/2017 |

\* cited by examiner

AZIMUTH RELIABILITY CLASS DETERMINATION TABLE

| CONDITIONS | | AZIMUTH RELIABILITY CLASS |
|---|---|---|
| AZIMUTH ESTIMATION CALCULATION STATUS | STATE VARIABLE S | |
| 3: AZIMUTH ESTIMATION CALCULATION CONTINUING | INITIALIZE STATE VARIABLE S TO 0 | 7: 0.5 DEGREE CLASS |
| 2: DURING AUTONOMOUS NAVIGATION | LOWER THAN OR EQUAL TO DIRLV5_LMT | 6: 1 DEGREE CLASS |
| | HIGHER THAN DIRLV5_LMT AND LOWER THAN OR EQUAL TO DIRLV4_LMT | 5: 5 DEGREE CLASS |
| | HIGHER THAN DIRLV4_LMT AND LOWER THAN OR EQUAL TO DIRLV3_LMT | 4: 10 DEGREE CLASS |
| | HIGHER THAN DIRLV3_LMT AND LOWER THAN OR EQUAL TO DIRLV2_LMT | 3: 20 DEGREE CLASS |
| | HIGHER THAN DIRLV2_LMT AND LOWER THAN OR EQUAL TO DIRLV1_LMT | 2: 30 DEGREE CLASS |
| | OTHER THAN THOSE ABOVE | 1: OVER 30 DEGREE CLASS |
| OTHER THAN THOSE ABOVE | | 0: UNDEFINED |

FIG. 5

THRESHOLD GROUP SELECTION TABLE

| SPEED / AZIMUTH RELIABILITY CLASS | CLASS: 0<br>LESS THAN AA km/h | CLASS: 1<br>LESS THAN BB km/h | CLASS: 2<br>LESS THAN CC km/h | CLASS: 3<br>CC km/h OR HIGHER |
|---|---|---|---|---|
| 0: UNDEFINED (DEFAULT) | P3 | P2 | P2 | P1 |
| 1: OVER 30 DEGREE CLASS | P4 | P4 | P3 | P3 |
| 2: 30 DEGREE CLASS | P4 | P4 | P3 | P2 |
| 3: 20 DEGREE CLASS | P4 | P3 | P2 | P2 |
| 4: 10 DEGREE CLASS | P4 | P3 | P2 | P1 |
| 5: 5 DEGREE CLASS | P3 | P3 | P2 | P1 |
| 6: 1 DEGREE CLASS | P3 | P2 | P1 | P1 |
| 7: 0.5 DEGREE OR LOWER CLASS | P2 | P2 | P1 | P1 |

FIG. 6

EVALUATION PARAMETER THRESHOLD GROUP LIST

| EVALUATION PARAMETER THRESHOLD GROUPS | THRE_VAR1_A | THRE_VAR1_B | THRE_VAR2_A | THRE_VAR2_B | THRE_VAR3_A | THRE_VAR3_B |
|---|---|---|---|---|---|---|
| P1 | 0.01 | 0.05 | 0.07 | 1.00 | 0.003 | 0.012 |
| P2 | 0.02 | 0.06 | 0.14 | 2.00 | 0.006 | 0.012 |
| P3 | 0.03 | 0.07 | 0.21 | 2.00 | 0.009 | 0.012 |
| P4 | 0.04 | 0.08 | 0.28 | 3.00 | 0.012 | 0.024 |

AZIMUTH ESTIMATION DEVICE

CROSS REFERENCE TO RELATED APPLICATION

The present application is a continuation application of International Patent Application No. PCT/JP2018/023807 filed on Jun. 22, 2018, which designated the U.S. and claims the benefit of priority from Japanese Patent Application No. 2017-136433 filed on Jul. 12, 2017. The entire disclosures of all of the above applications are incorporated herein by reference.

TECHNICAL FIELD

The present disclosure relates to an azimuth estimation device.

BACKGROUND

A current position estimation method may be called autonomous navigation. In autonomous navigation, the amount of azimuth angle change determined from values detected by a yaw rate sensor is added to a reference azimuth to update an azimuth. A speed is also estimated from a detection value of a speed sensor or an acceleration sensor.

SUMMARY

The present disclosure describes an azimuth estimation device, which estimates an azimuth to which a moving object moves.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

In a related field, a method in which Doppler shift frequencies that are the frequency shift amounts of navigation signals transmitted by navigation satellites are stored on a time-series basis, a vehicle speed and/or a yaw rate is acquired on a time-series basis, and an azimuth is estimated from these values.

By using a method in the related field, an azimuth may be estimated with higher accuracy. Thus, it may be considered to use an azimuth estimated by the method in the related field as a reference azimuth used in autonomous navigation.

However, the estimated azimuth may have an error, and the error may vary every time the azimuth is estimated. Consequently, if an azimuth, which has been estimated by the method in the related field, is always used as a reference azimuth, an error in an estimated azimuth may increase.

Meanwhile, when autonomous navigation continues, errors in yaw rates detected by the yaw rate sensor are accumulated, thereby increasing errors in azimuth estimation. Consequently, if the reference azimuth is not updated for a longer time, azimuth estimation errors remain large.

In one or more embodiments of the present disclosure, an azimuth estimation device reduces error increasing in azimuths estimated in autonomous navigation.

An azimuth estimation device according to a first aspect of the present disclosure is an azimuth estimation device mounted on a moving object and successively estimates an azimuth to which the moving object moves. The azimuth estimation device includes: a satellite data acquisition unit that acquires, on a time-series basis, Doppler shift frequencies of navigation signals received by a GNSS receiver; a sensor data acquisition unit that acquires, on a time-series basis, magnitude of speed of the moving object from a speed sensor disposed at the moving object, and acquires, on a time-series basis, a yaw rate of the moving object from a yaw rate sensor disposed at the moving object; a Doppler azimuth estimation unit that estimates the azimuth of the moving object, based on equations for estimating the azimuth of the moving object at different times, the equations formulated based on the Doppler shift frequencies acquired on a time-series basis, and including an unknown parameter that vary at each time and is constrained by the magnitude of speed of the moving object and linearization of change of a clock drift over time; a state variable determination unit that determines a state variable indicating reliability of an azimuth angle, the state variable increasing according to an elapsed time since update of a reference azimuth to which an amount of azimuth angle change calculated based on the yaw rate is added in autonomous navigation; a threshold selection unit that selects, from plural evaluation parameter threshold groups for determining whether to adopt the azimuth estimated by the Doppler azimuth estimation unit as the reference azimuth, one of the evaluation parameter threshold groups that allows an adopting condition to be satisfied more easily even if the reliability of the azimuth angle is lower, as the state variable determined by the state variable determination unit is a value indicating that the reliability of the azimuth angle is lower; an evaluation parameter calculation unit that calculates plural evaluation parameters for evaluating reliability of an azimuth when the Doppler azimuth estimation unit estimates the azimuth; and an adopting determination unit that compares the plural evaluation parameters with the evaluation parameter threshold group selected by the threshold selection unit, and based on determination that the adopting condition is satisfied, determines adoption of the azimuth estimated by the Doppler azimuth estimation unit as the reference azimuth.

An azimuth estimation device according to a second aspect of the present disclosure is an azimuth estimation device mounted on a moving object and successively estimates an azimuth to which the moving object moves. The azimuth estimation device includes: a satellite data acquisition unit that acquires, on a time-series basis, Doppler shift frequencies of navigation signals received by a GNSS receiver; a sensor data acquisition unit that acquires, on a time-series basis, magnitude of speed of the moving object from a speed sensor disposed at the moving object, and acquires, on a time-series basis, a yaw rate of the moving object from a yaw rate sensor disposed at the moving object; a Doppler azimuth estimation unit that estimates the azimuth of the moving object, based on equations for estimating the azimuth of the moving object at different times, the equations formulated based on the Doppler shift frequencies acquired on a time-series basis, and including an unknown parameter that vary at each time and is constrained by the magnitude of speed of the moving object and linearization of change of a clock drift over time; a state variable determination unit that determines a state variable indicating reliability of an azimuth angle, the state variable increasing according to an elapsed time since update of a reference azimuth to which an amount of azimuth angle change calculated based on the yaw rate is added in autonomous navigation; a threshold selection unit that selects, from plural evaluation parameter threshold groups for determining whether to adopt the azimuth estimated by the Doppler azimuth estimation unit as the reference azimuth, one of the evaluation parameter threshold groups that allows an adopting condition to be satisfied more easily even if the reliability of the azimuth angle is lower, as the state variable determined by the state variable determination unit is a value indicating that the reliability of the azimuth angle is lower; an evaluation parameter calculation unit that calculates plural evaluation parameters for evaluating reliability of an azimuth when the Doppler azimuth estimation unit estimates the azimuth; and an adopting determination unit that compares the plural evaluation parameters with the evaluation parameter threshold group selected by the threshold selection unit, and based on determination that the adopting condition is satisfied, determines adoption of the azimuth estimated by the Doppler azimuth estimation unit as the reference azimuth.

The above azimuth estimation devices determine the state variable that represents the degree of reliability of the azimuth angle. As the state variable indicates that the reliability of the azimuth angle is lower, the azimuth estimation devices set the evaluation parameter threshold group to be compared with the plural evaluation parameters to one of the evaluation parameter threshold groups that allows the adopting condition to be satisfied more easily even if the reliability of the azimuth angle is lower. Consequently, even if the azimuth estimated by the Doppler azimuth estimation unit does not have a sufficiently high reliability, it is adopted as the reference azimuth. Thus, update of the reference azimuth is facilitated at an early stage, so that error increases in azimuths estimated in autonomous navigation may be reduced.

Figure 1:
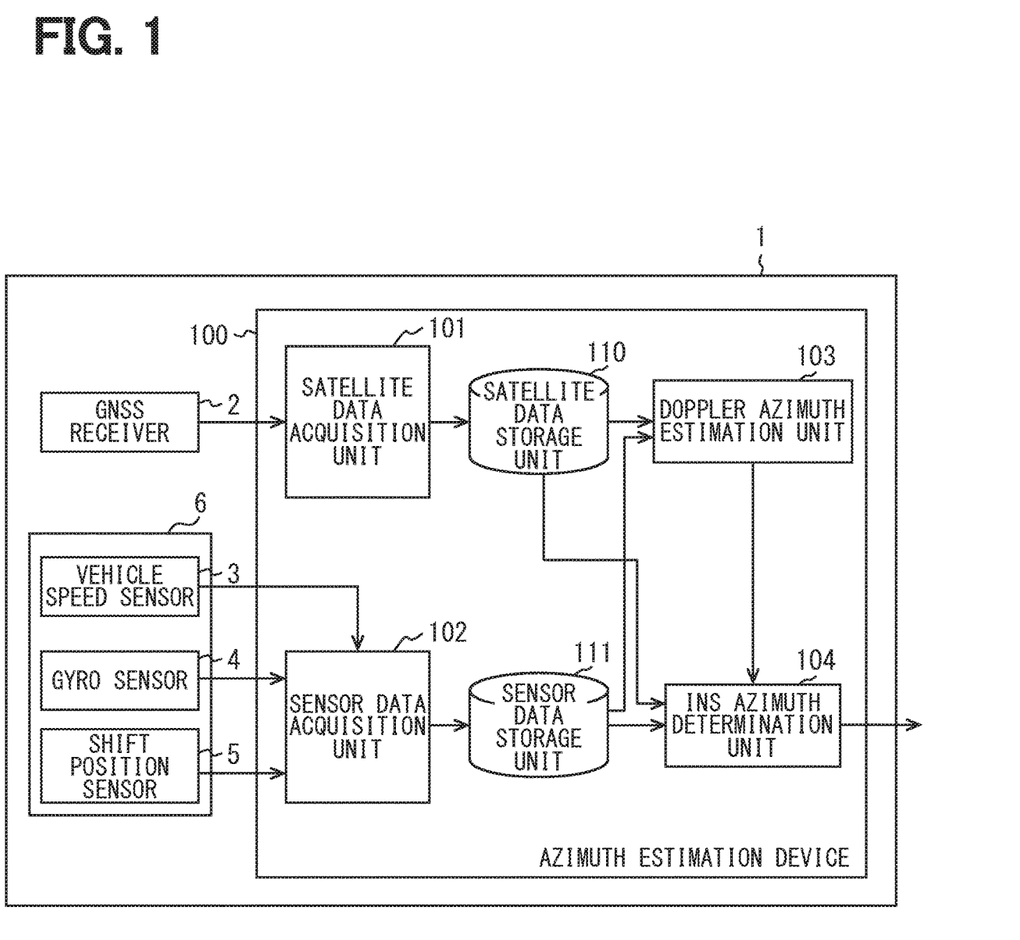
FIG. 1 is a block diagram showing a configuration of an azimuth estimation device.

Hereinafter, an embodiment will be described with reference to the drawings. An azimuth estimation device 100 shown in FIG. 1 is mounted on a vehicle 1 that is a moving object, together with a GNSS receiver 2, a vehicle speed sensor 3, a gyro sensor 4, and a shift position sensor 5. When the power of the vehicle 1 is turned on, the azimuth estimation device 100 is also supplied with power supply. While the azimuth estimation device 100 is supplied with power supply, the azimuth estimation device 100 successively estimates an azimuth angle θ.

Configuration Overview

The GNSS receiver 2 receives navigation signals transmitted by a navigation satellite Si included in a Global Navigation Satellite System (GNSS). "i" is the number of the navigation satellite. The GNSS is, for example, GPS. A navigation signal is superimposed on a carrier wave and transmitted from the navigation satellite Si as a radio wave. Hereinafter, a radio wave transmitted by the navigation satellite Si is referred to as a GNSS radio wave. The GNSS receiver 2 demodulates a GNSS radio wave which has received to extract a navigation signal.

From the extracted navigation signal, a pseudorange $\rho_i$, a Doppler shift frequency $D_i$, a satellite position $(X_{si}, Y_{si}, Z_{si})$, a satellite status, navigation data, etc. are determined. The navigation data includes the satellite number of the navigation satellite Si, an ephemeris that is orbit information of the navigation satellite Si, and the time when the navigation satellite Si has transmitted the radio wave.

The satellite position $(X_{si}, Y_{si}, Z_{si})$ of each navigation satellite Si is calculated based on the ephemeris of the navigation satellite Si and the time when the GNSS radio wave has been transmitted. The pseudorange $\rho_i$ is calculated by multiplying the time difference between the time when the navigation satellite Si has transmitted the GNSS radio wave and the time when the GNSS receiver 2 has received the GNSS radio wave, i.e. a radio wave propagation time, by the speed of light C.

The Doppler shift frequency $D_i$ is the frequency difference between the frequency of the carrier wave of the radio wave transmitted by the navigation satellite Si and the frequency of the carrier wave of the received GNSS radio wave. The carrier frequency of radio waves transmitted by the navigation satellite Si is determined in advance. This frequency is stored in advance in a predetermined storage unit included in the GNSS receiver 2.

The GNSS receiver 2 outputs these values to the azimuth estimation device 100 in a fixed cycle together with the S/N of the navigation signal that is a received signal and the time when the navigation signal has been received. Information output by the GNSS receiver 2 to the azimuth estimation device 100 is information before a position is calculated in satellite navigation. Hereinafter, information, which is before a position is calculated in satellite navigation, is referred to as satellite data. The fixed cycle in which the GNSS receiver 2 outputs satellite data is, for example, between 200 milliseconds and 400 milliseconds. There are plural navigation satellites Si. The GNSS receiver 2 determines satellite data from all navigation signals that may be demodulated from GNSS radio waves, and outputs all the determined satellite data to the azimuth estimation device 100.

The vehicle speed sensor 3 detects a wheel rotation speed of the vehicle 1. The vehicle speed sensor 3 outputs a signal indicating the wheel rotation speed to the azimuth estimation device 100.

The gyro sensor 4 detects rotational angular velocities around the yaw axis, pitch axis, and roll axis of the vehicle 1, and outputs a signal indicating the detected rotational angular velocities to the azimuth estimation device 100. The gyro sensor 4 functions as a yaw rate sensor because the gyro sensor 4 detects a rotational angular velocity around the yaw axis, i.e. a yaw rate.

The shift position sensor 5 detects the shift position of the vehicle 1, and outputs a signal indicating the shift position to the azimuth estimation device 100. Based on the signal output by the shift position sensor 5, it is determined whether the movement direction of the vehicle 1 is forward or backward.

The vehicle speed sensor 3, the gyro sensor 4, and the shift position sensor 5 are behavior detection sensors 6 that output signals indicating the movement, i.e. the behavior of the vehicle 1.

The azimuth estimation device 100 includes a computer (not shown) including, for example, a CPU, a ROM, a RAM. The CPU executes programs stored in a non-transitory tangible storage medium such as a ROM while using a temporary storage function of a RAM. Thus, the azimuth estimation device 100 performs functions as a satellite data acquisition unit 101, a sensor data acquisition unit 102, a Doppler azimuth estimation unit 103, and an INS (Inertia Navigation System) azimuth determination unit 104. When these functions are performed, methods corresponding to the programs stored in the non-transitory tangible storage medium are executed. Part or all of the functions performed by the azimuth estimation device 100 may be configured as a hardware device using one or more ICs, or the like.

<Outline of Processing Executed by Heading Estimation Device>

The following describes an outline of processing executed by the azimuth estimation device 100. Part of the processing executed by the azimuth estimation device 100 will be described in detail with reference to the flowcharts shown in FIGS. 2 and 3.

The satellite data acquisition unit 101 acquires, on a time-series basis, satellite data from the GNSS receiver 2 in a satellite data acquisition cycle, and stores the acquired satellite data in a satellite data storage unit 110. The satellite data acquisition cycle is equal to the cycle in which the GNSS receiver 2 outputs satellite data. The satellite data storage unit 110 is a writable storage medium, and may be volatile or nonvolatile. For the satellite data storage unit 110, for example, a RAM may be used.

The sensor data acquisition unit 102 acquires, on a time-series basis, signals detected by the behavior detection sensors 6 in a sensor value acquisition cycle. The sensor value acquisition cycle is shorter than the cycle in which the GNSS receiver 2 outputs navigation signals, and is, for example, several tens of milliseconds. The sensor data acquisition unit 102 stores the acquired signals in a sensor data storage unit 111. The sensor data storage unit 111 is a writable storage medium, and may be volatile or nonvolatile. For the sensor data storage unit 111, for example, a RAM may be used. For the sensor data storage unit 111, the same storage medium as the satellite data storage unit 110 may be used.

The Doppler azimuth estimation unit 103 calculates an azimuth angle (i.e. an azimuth angle initial value) $\theta^0$ of the vehicle 1 in a traveling direction at an initial time, using an azimuth estimation expression shown in expression (1). The initial time is the time when the azimuth angle initial value $\theta^0$ is updated.

[Expression 1]

$$Vs^t_i = V^\pi_{wheel} Gx^t_i \cos(\theta^0 + \theta^t_{gyro}) + V^\pi_{wheel} Gy^t_i \sin(\theta^0 + \theta^t_{gyro}) - Cbv^0 - At \quad (1)$$

Expression (1) is an equation described as expression (6) in JP 5879977 B2. In Expression (1), $Vs_i$ is a satellite direction velocity, t is a time, $V_{wheel}$ is a detection value of the vehicle speed sensor 3, $\theta_{gyro}$ is the amount of change in the azimuth angle of the vehicle 1 in the traveling direction, i.e. a relative azimuth angle, $Cbv^0$ is a clock drift at the initial time, A is the slope of change of the clock drift Cbv over time, and Gx and Gy are an x component and a y component of a line-of-sight vector from the vehicle 1 to the navigation satellite Si.

The satellite direction velocity $Vs_i$ on the left side of expression (1) is calculated from expression (2).

[Expression 2]

$$Vs^t_i = \frac{D^t_i}{f}C + Gx^t_i Vxs^t_i + Gy^t_i Vys^t_i + Gz^t_i Vzs^t_i \quad (2)$$

The first term on the right side of expression (2) means the relative velocity $Vr_i$ of the vehicle 1 with respect to the navigation satellite Si. The second, third, and fourth terms mean the velocity of the navigation satellite Si in the direction of the vehicle 1. The sum of these terms means the velocity of the vehicle 1 in the direction of the navigation satellite Si, and thus expression (2) holds. In expression (2), $D_i$ is the Doppler shift frequency. Thus, in expression (1), the azimuth angle initial value $\theta^0$ is calculated using the Doppler shift frequency $D_i$.

Figure 2:
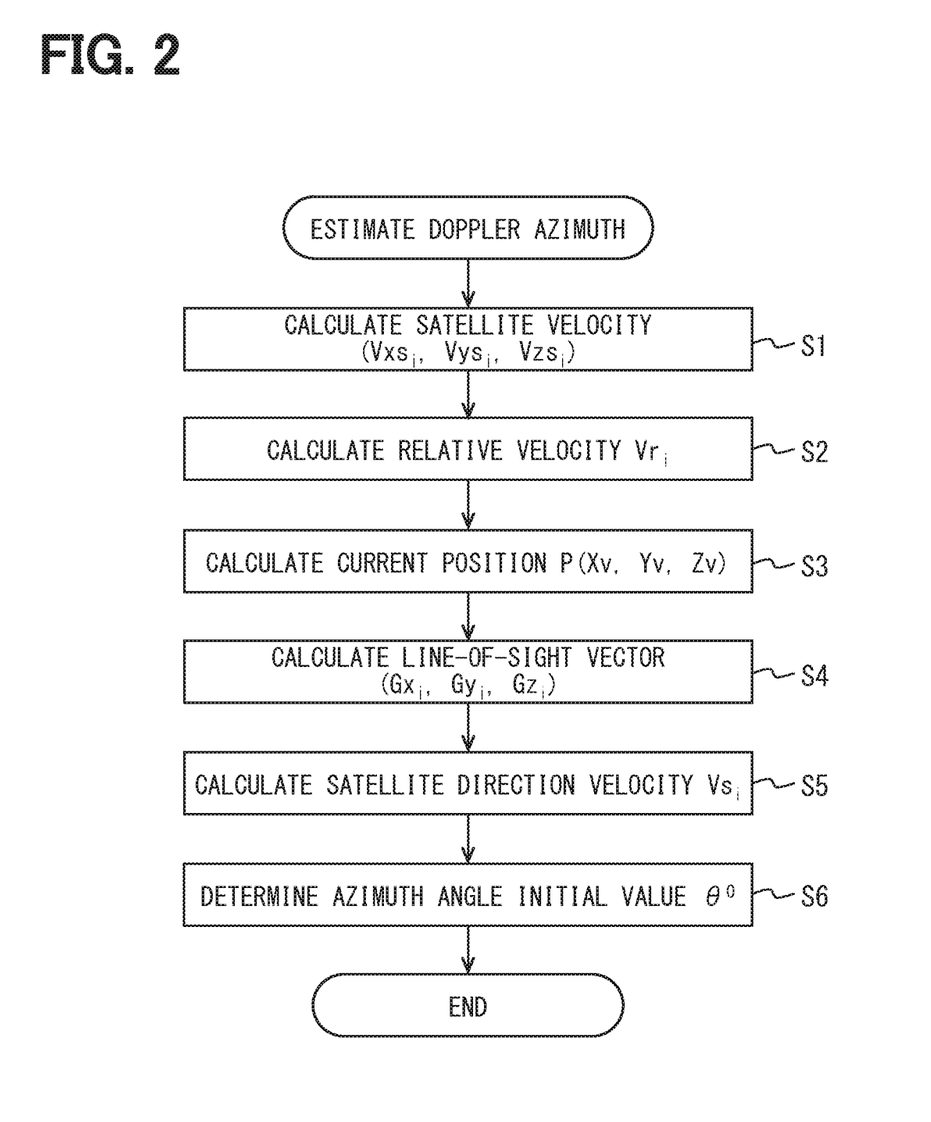
FIG. 2 is a flowchart showing processing executed by a Doppler azimuth estimation unit in FIG. 1.

The processing of the Doppler azimuth estimation unit 103 will be described with reference to FIG. 2. In S1, the velocity vector $(Vxs_i, Vys_i, Vzs_i)$ of each navigation satellite Si is calculated from the time-series data of the satellite position $(X_{si}, Y_{si}, Z_{si})$ of the navigation satellite Si stored in the satellite data storage unit 110.

In S2, the Doppler shift frequency $D_i$ included in the satellite data stored in the satellite data storage unit 110 is substituted into expression (3) to calculate the current relative velocity $Vr_i$ of the vehicle with respect to the navigation satellite Si. In expression (3), C is the speed of light, and F is the frequency of GNSS radio waves transmitted by the navigation satellite Si.

[Expression 3]

$$Vr_i = -D_i \cdot C/F \quad (3)$$

In S3, the current position $P(X_v, Y_v, Z_v)$ of the vehicle 1 is calculated. The position P of the vehicle 1 is used for calculating the line-of-sight vector $(Gx_i, Gy_i, Gz_i)$ from the vehicle 1 to the navigation satellite Si.

If four or more high-quality navigation signals have been received, the position $P(X_v, Y_v, Z_v)$ and the clock drift Cbv that are unknowns may be calculated by formulating four or more simultaneous equations using the navigation signals. However, the position of the vehicle 1 here is used to calculate the line-of-sight vector $(Gx_i, Gy_i, Gz_i)$ from the vehicle 1 to the navigation satellite Si in next S4. Since the navigation satellite Si is located in the distance, the current position used for determining the angle between the navigation satellite Si and the vehicle 1 may be low in accuracy. Thus, it may not be necessary to have received four or more high-quality signals.

Thus, for example, in S3, the current coordinates $(X_v, Y_v, Z_v)$ of the vehicle 1 may be calculated, using four or more navigation signals including any signal that may not be determined to be of high quality. When the current coordinates $(X_v, Y_v, Z_v)$ of the vehicle 1 are calculated from four or more navigation signals, the pseudorange $\rho_i$ and the satellite position $(X_{si}, Y_{si}, Z_s)$ of the navigation satellite Si are calculated, and the coordinates $(X_v, Y_v, Z_v)$ of the vehicle 1 are determined so that the residual of the pseudorange $\rho_i$ is minimized.

Alternatively, the position $P(X_v, Y_v, Z_v)$ of the vehicle 1 may be determined by a method with low accuracy other than position determination using the pseudorange $\rho_i$. Depending on estimation accuracy allowed in a system or the like, a position error of the vehicle 1 in the range of several hundreds of meters results in a speed estimation error of 1 m/sec or smaller, causing no significant matter. Thus, for example, the position may be determined from a map or the like, or the position $P(X_v, Y_v, Z_v)$ of the vehicle 1 may be determined from information such as a past position determination history or a beacon.

In S4, the line-of-sight vector ($Gx_i$, $Gy_i$, $Gz_i$) from the vehicle 1 to the navigation satellite Si is calculated. The x component, y component, and z component of the line-of-sight vector are calculated from expression (4).

[Expression 4]

$$Gx_i^t = \frac{1}{\rho_i^t}(X_{si}^t - X_v^t),\ Gy_i^t = \frac{1}{\rho_i^t}(Y_{si}^t - Y_v^t),\ Gz_i^t = \frac{1}{\rho_i^t}(Z_{si}^t - Z_v^t) \quad (4)$$

In expression (4), $\rho_i^t$ is the pseudorange of the navigation satellite Si at a time t, and ($X_{si}^t$, $Y_{si}^t$, $Z_{si}^t$) is the satellite position of the navigation satellite Si at the time t. ($X^t v$, $Y^t v$, $Z^t v$) is the current position of the vehicle 1 at the time t, and is calculated in S3.

In S5, the relative velocity $Vr_i$ calculated in S2, the line-of-sight vector ($Gx_i$, $Gy_i$, $Gz_i$) calculated in S4, and the velocity vector ($Vxs_i$, $Vys_i$, $Vzs_i$) of the navigation satellite Si calculated in S1 are substituted into expression (2) described above to calculate the satellite direction velocity $Vs_i$ of the vehicle 1 in the direction of the navigation satellite Si.

In S6, the satellite direction velocity $Vs_i$ calculated in S5, the relative azimuth angle $\theta_{gyro}$ updated using a yaw rate acquired from the sensor data storage unit 111, and the line-of-sight vector ($Gx_i$, $Gy_i$, $Gz_i$) calculated in S4 are substituted into expression (1). This results in three unknown parameters, $\theta^0$, $Cbv^0$, and A in expression (1).

Thus, three or more equations are formulated in which the satellite direction velocity $Vs_i$, the relative azimuth angle $\theta_{gyro}$, and the line-of-sight vector ($Gx_i$, $Gy_i$, $Gz_i$) are substituted into expression (1). Then, simultaneous equations of the three or more equations are solved. As a result, the azimuth angle initial value $\theta^0$ that is an unknown parameter in expression (1) may be determined.

The unknown parameters $\theta^0$, $Cbv^0$, and A are the same even at different times after the initial time. Therefore, it may not be necessary to formulate three equations at the same time. If the total number of equations formulated at plural times is three or more, the unknown parameters may be determined. For example, even if the number of observed satellites at each of three times ($t_0$, $t_1$, $t_2$) is one, the azimuth angle initial value $\theta^0$ may be determined using observed satellite data.

The INS azimuth determination unit 104 calculates the amount of azimuth angle change (i.e. the relative azimuth angle $\theta_{gyro}$) by multiplying a yaw rate determined from detection values of the gyro sensor 4 that is an inertial sensor by the sensor value acquisition cycle. The amount of azimuth angle change is added to a reference azimuth to determine the azimuth angle $\theta$. The reference azimuth is the azimuth angle initial value $\theta^0$ estimated by the Doppler azimuth estimation unit 103.

Since the yaw rate is obtained in the sensor value acquisition cycle, the INS azimuth determination unit 104 updates the azimuth angle $\theta$ in the sensor value acquisition cycle. The azimuth angle $\theta$ is determined by adding the relative azimuth angle $\theta_{gyro}$ to the azimuth angle initial value $\theta^0$ that is the reference azimuth.

However, the INS azimuth determination unit 104 does not necessarily update the reference azimuth to the latest azimuth angle initial value $\theta^0$ every time the Doppler azimuth estimation unit 103 updates the azimuth angle initial value $\theta^0$. This is because the azimuth angle initial value $\theta^0$ also has an error, and using the azimuth angle initial value $\theta^0$ that has been used up to that time may enable determination of an azimuth angle $\theta$ having a smaller error.

Processing executed by the INS azimuth determination unit 104 is described with reference to FIG. 3. The INS azimuth determination unit 104 executes processing shown in FIG. 3 in the sensor value acquisition cycle.

In S11, it is determined whether the Doppler azimuth estimation unit 103 has calculated the azimuth angle initial value $\theta^0$. To calculate the azimuth angle initial value $\theta^0$, satellite data is required. Satellite data is acquired in the satellite data acquisition cycle that is longer than the sensor value acquisition cycle. When the radio wave environment is undesirable, navigation signals sometimes may not be received. Thus, the determination in S11 may be NO. If the Doppler azimuth estimation unit 103 has calculated the azimuth angle initial value $\theta^0$ after the previous execution of FIG. 3, the determination in S11 is YES. If the determination in S11 is YES, the process proceeds to S12.

In S12, it is determined whether Doppler azimuth estimation continues. A Doppler azimuth means an azimuth estimated by the Doppler azimuth estimation unit 103, i.e. the azimuth angle initial value $\theta^0$. "Doppler azimuth estimation continues" means a state where the Doppler azimuth estimation unit 103 has been able to continuously estimate the azimuth. It is determined that the Doppler azimuth estimation continues when the Doppler azimuth estimation unit 103 has been able to continuously estimate the azimuth for a fixed time or more in each satellite data acquisition cycle. The fixed time is set to a time equal to or more than plural times of the satellite data acquisition cycle, for example, 1 second.

When the Doppler azimuth estimation continues, an error in an estimated azimuth is reduced, that is, the reliability of an estimated azimuth is increased. Therefore, if the determination in S12 is YES, an azimuth reliability class is set to the highest class in S13. In addition, the value of a state variable S is set to 0. The state variable S will be described in S14. After the execution of S13, the process proceeds to S19.

If the determination in S12 is NO, the process proceeds to S14. In S14, the state variable S is calculated. In the present embodiment, the state variable S is calculated using expression (5).

[Expression 5]

$$S = S^0 + \int_{tc}^{t} A(v) dv \quad (5)$$

In expression (5), $S^0$ is an initial value of the state variable S. The initial value $S^0$ is a value used until S13 is executed after the azimuth estimation device 100 is turned on. When S13 is executed, the state variable S becomes 0. Thus, when S13 is executed, the initial value $S^0$ becomes 0.

When there is a previous end value that is the value of the state variable S at the time the azimuth estimation device 100 was turned off last time, the initial value $S^0$ is the previous end value. When the previous end value is absent, the initial value $S^0$ is set to a preset initial value.

In expression (5), "tc" is the time when the azimuth angle initial value $\theta^0$ used by the INS azimuth determination unit 104 to calculate the azimuth angle $\theta$ is updated, and the azimuth reliability class at that time was the highest class. However, tc is the time when the azimuth estimation device 100 is turned on, until S13 is executed after the azimuth estimation device 100 is turned on.

"t" is the current time, "v" is the vehicle speed, and A(v) is a value determined with the vehicle speed as a variable. Specifically, A(v) is relatively small when the speed "v" is relatively high, and is relatively large when the speed "v" is relatively low. For example, A(v) may be a function that becomes 0 when the vehicle speed is 0, A1 when the speed "v" is higher than a certain speed "v1", and A2 (>A1) when the speed "v" is lower than the speed "v1" and higher than 0.

A(v) may not be limited to this situation, and may be a function whose value continuously decreases as the speed "v" increases. A(v) may be a table form in which the value is determined according to the speed "v".

The value of the state variable S increases as the elapsed time since the update of the azimuth angle initial value $\theta^0$ used by the INS azimuth determination unit 104 to calculate the azimuth angle $\theta$ increases. As the elapsed time since the update of the azimuth angle initial value $\theta^0$ increases, errors in yaw rates are accumulated, so that an error in the azimuth angle $\theta$ increases. The state variable S is a variable for evaluating this error. Thus, A(v) is determined so that the value of the state variable S correlates with the error of the azimuth angle $\theta$. As described above, the reason why A(v) is made relatively smaller when the speed "v" is relatively higher is that the higher the speed "v" is, the smaller an error in a yaw rate is.

Figure 3:
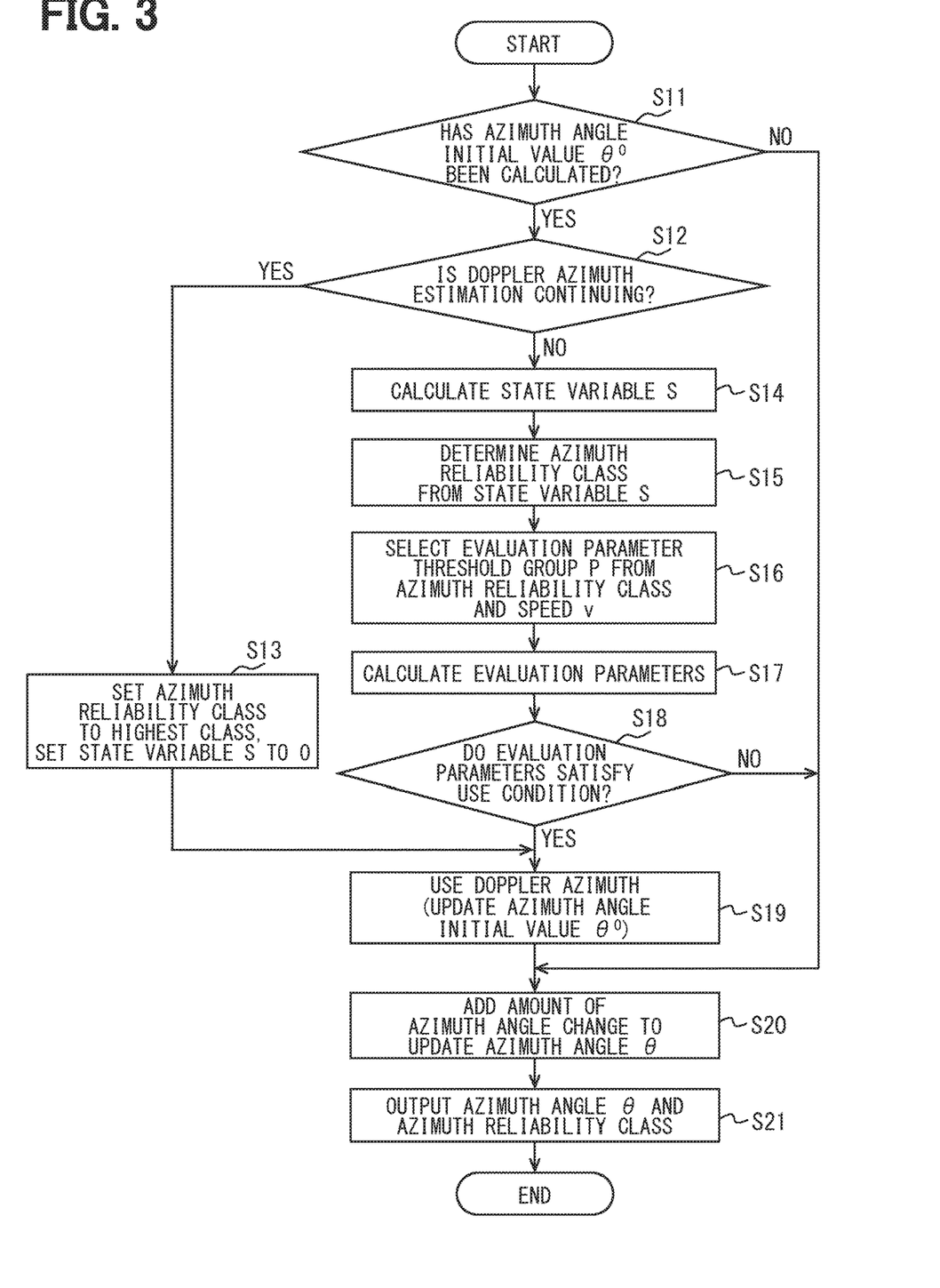
FIG. 3 is a flowchart showing processing executed by an INS azimuth determination unit in FIG. 1.
Figure 4:
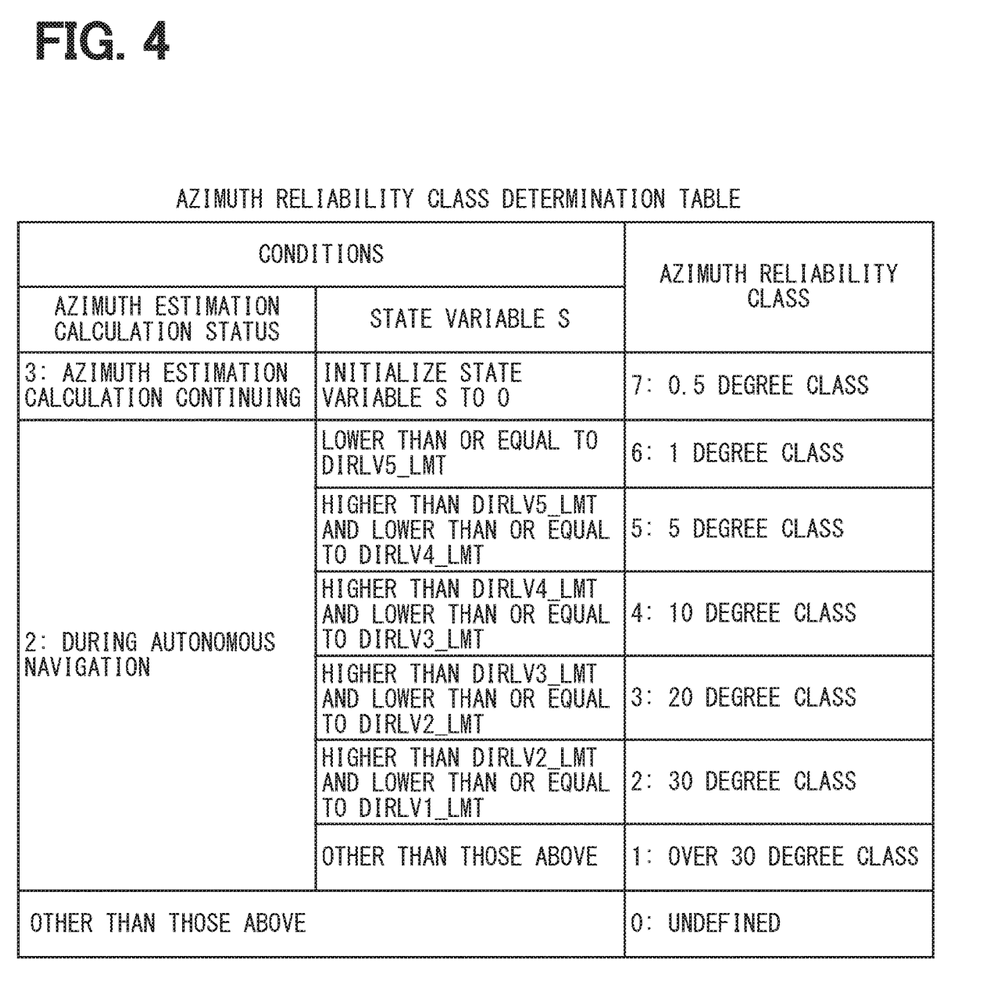
FIG. 4 is a diagram showing an azimuth reliability class determination table used in part of the processing in FIG. 3.

In S15, an azimuth reliability class is determined from the state variable S and an azimuth reliability class determination table shown in FIG. 4. In FIG. 4, DIRLVn_LMT (n is 1 to 5) is a threshold for the state variable S. Thus, the azimuth reliability class determination table shown in FIG. 4 is a table in which a azimuth reliability class is determined from the value of the state variable S.

In FIG. 4, "azimuth estimation calculation continuing" means that the Doppler azimuth estimation described above continues. Autonomous navigation means a positioning method in which the movement amount of the vehicle 1 is successively calculated from the azimuth angle $\theta$ determined by the INS azimuth determination unit 104 and the speed "v" to update the current position of the vehicle 1.

In FIG. 4, an azimuth reliability class with a larger numerical value means that the reliability of the azimuth angle $\theta$ is higher. In other words, the error in the azimuth angle $\theta$ is smaller. In FIG. 4, an azimuth reliability class of 7 means that the error is 0.5 degrees or less.

The degree of the error when the azimuth reliability class is the highest class is determined by preliminarily measuring the degree to which the difference from a reference value converges. The reference value is a value measured with a high-precision position measurement system mounted on the vehicle 1. The high-precision position measurement system includes, for example, a high-precision gyro sensor used in an aircraft, a high-resolution vehicle speedometer. When the difference between the reference value and an azimuth estimated by the Doppler azimuth estimation unit 103 converges in a certain range in a desirable radio wave environment, that range of difference is used as an error in the highest class.

Thresholds of the state variable S, which determine azimuth reliability classes lower than the highest class, are also determined by actually measuring differences from the reference value measured by the above-described high-precision position measurement system.

Figure 5:
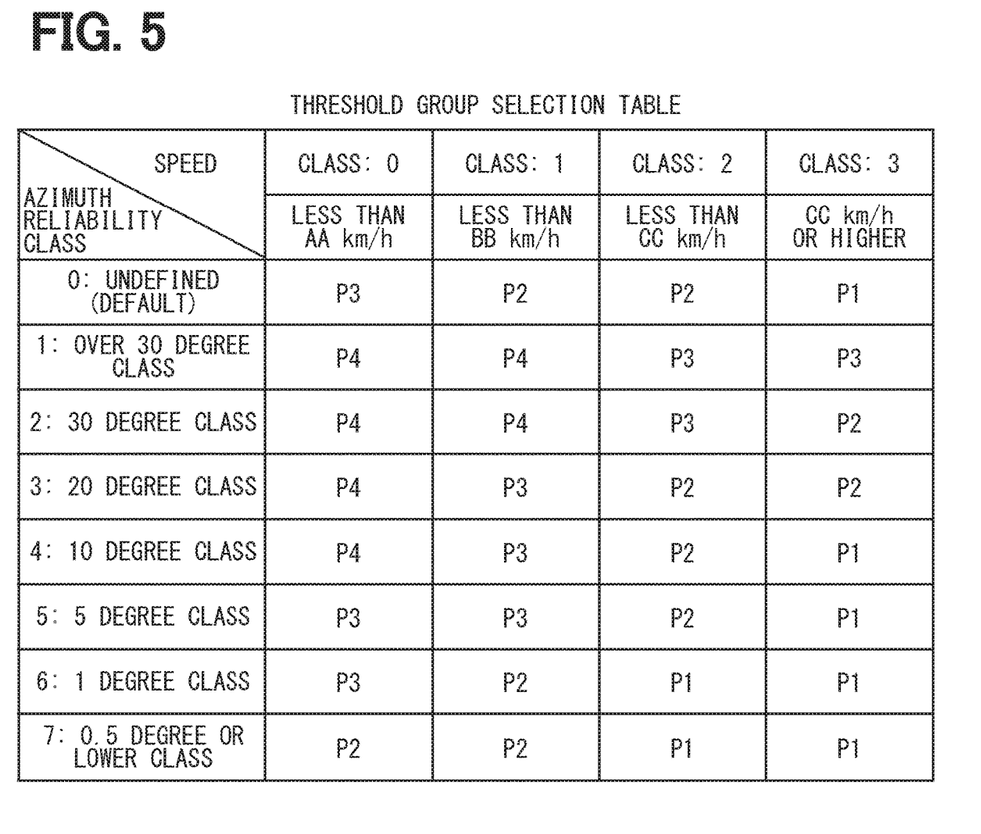
FIG. 5 is a diagram showing a threshold group selection table used in part of the processing in FIG. 3.

In subsequent S16, an evaluation parameter threshold group P is selected from the azimuth reliability class determined in S15, the current speed "v", and a threshold group selection table shown in FIG. 5. The threshold group selection table is a table for selecting one evaluation parameter threshold group P from plural evaluation parameter threshold groups P.

Each evaluation parameter threshold group P includes thresholds for plural evaluation parameters (hereinafter, evaluation parameter thresholds). The evaluation parameter thresholds are thresholds for evaluating an error in an azimuth estimated by the Doppler azimuth estimation unit 103. The evaluation parameters are, for example, the maximum value, average, variance, covariance, time-series variance, and the like of the residuals of the Doppler shift frequencies $D_i$ of the navigation satellites Si. As may be seen from expressions (1) and (2), the Doppler shift frequencies $D_i$ affect the value of the azimuth angle initial value $\theta^0$. Thus, these are evaluation parameters for evaluating an error in an azimuth estimated by the Doppler azimuth estimation unit 103.

Figure 6:
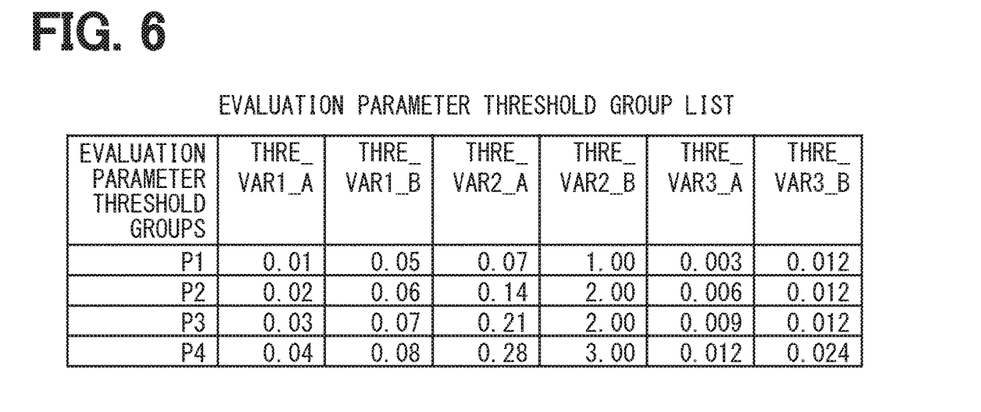
FIG. 6 is a diagram showing an evaluation parameter threshold group list.

FIG. 5 is a table in which an evaluation parameter threshold group P is determined from an azimuth reliability class and a speed class. Evaluation parameter threshold groups P1 to P4 shown in FIG. 5 each include plural evaluation parameter thresholds. FIG. 6 shows an example of the evaluation parameter thresholds of the evaluation parameter threshold groups P1 to P4. In FIG. 6, THRE_VAR1_A, THRE_VAR1_B, etc. are the evaluation parameter thresholds.

In the threshold group selection table shown in FIG. 5, as the azimuth reliability class is lower, that is, as the azimuth reliability class is a class indicating that the azimuth reliability is lower, the evaluation parameter thresholds have values indicating a lower reliability. As the speed class is a class of a lower speed, the evaluation parameter thresholds have values indicating a lower reliability.

As in FIG. 4, the evaluation parameter thresholds included in the evaluation parameter threshold groups P shown in FIG. 5 are determined by calculation from the Doppler shift frequencies $D_i$ or the like actually obtained in states where the differences between the reference value measured by the high-precision position measurement system mounted on the vehicle 1, and azimuths estimated by the Doppler azimuth estimation unit 103 have converged to the azimuth reliability classes shown in FIG. 4.

When the Doppler azimuth estimation unit 103 estimates an azimuth, the reliability of the azimuth estimated by the Doppler azimuth estimation unit 103 may be evaluated by comparing evaluation parameters calculated from the Doppler shift frequencies $D_i$ or the like at that time with the evaluation parameter thresholds.

In S17, evaluation parameters are calculated from the Doppler shift frequencies $D_i$ or the like when the Doppler azimuth estimation unit 103 has estimated the azimuth. In S18, the evaluation parameter thresholds included in the evaluation parameter threshold group P selected in S16 are compared with the evaluation parameters calculated in S17 to determine whether an adopting condition is satisfied.

For example, the condition may be that all the evaluation parameters have attained the evaluation parameter thresholds. "The evaluation parameters have attained the evaluation parameter thresholds" means that the evaluation parameters have values of a higher azimuth reliability than the evaluation parameter thresholds do.

Other than this situation, the adopting condition may be an adopting condition that is satisfied when a predetermined percentage (for example, 80%) of the plural evaluation parameters have attained the evaluation parameter thresholds. Alternatively, the degree of attainment of the evaluation parameters may be ranked to score to determine whether the adopting condition is satisfied using the total score of all the evaluation parameters.

When the determination in S18 is YES, it may be considered that the reliability of the azimuth estimated by the Doppler azimuth estimation unit 103 is higher than the reliability of the current azimuth angle θ. Thus, if the determination in S18 is YES, the process proceeds to S19, and the azimuth angle initial value $θ^0$ calculated by the Doppler azimuth estimation unit 103 is used as a reference azimuth used by the INS azimuth determination unit 104. That is, the azimuth angle initial value $θ^0$ used by the INS azimuth determination unit 104 is updated. When S13 is executed, S19 is also executed. In S20, the amount of azimuth angle change from the update of the azimuth angle initial value $θ^0$ to the present point in time is calculated, and the amount of azimuth angle change is added to the azimuth angle initial value $θ^0$ to update the azimuth angle θ.

In S21, the azimuth angle θ updated in S20 and the latest azimuth reliability class are output to an application that uses these values. An example of the application is a position estimation application that performs autonomous navigation using the azimuth angle θ and the speed "v" of the vehicle 1.

In the processing in FIG. 3, S14 corresponds to a state variable determination unit, S15 corresponds to a reliability class determination unit, S16 corresponds to a threshold selection unit, S17 corresponds to an evaluation parameter calculation unit, and S18 and S19 correspond to an adopting determination unit.

The azimuth estimation device 100 of the present embodiment calculates the state variable S that represents the degree of reliability of the azimuth angle θ (S14). As the state variable S indicates that the reliability of the azimuth angle θ is lower, the azimuth estimation device 100 sets the evaluation parameter threshold group P, which is to be compared with the plural evaluation parameters, to an evaluation parameter threshold group P that allows the adopting condition to be satisfied more easily even if the reliability of the azimuth angle θ is lower. Consequently, even if an azimuth estimated by the Doppler azimuth estimation unit 103 does not have a sufficiently high reliability, the estimated azimuth is used as a reference azimuth. Thus, update of the reference azimuth is facilitated at an early stage, so that it is possible to reduce error increasing in azimuths estimated in autonomous navigation may be reduced.

Although the embodiment has been described above, the disclosed technology may not be limited to the above-described embodiment. The following modifications are also included in the disclosed scope. In addition to the following, various modifications may be made without departing from the gist.

It is noted that a flowchart or the processing of the flowchart in the present application includes sections (also referred to as steps), each of which is represented, for instance, as S2. Further, each section may be divided into several sub-sections while several sections may be combined into a single section. Furthermore, each of thus configured sections may be also referred to as a device, module, or means.

First Modification

Expression (1) shown in the above-described embodiment is an equation obtained by constraining a relational expression of the satellite direction velocity $Vs_i$ and the velocity vector of the vehicle 1, using the following constraint conditions 1 to 3. Vx and Vy are an x component and a y component of the velocity vector of the vehicle 1, respectively.

[Expression 6]

$$\begin{cases} Vx^t = V^t_{wheel} \cos(θ^0 + θ^t_{gyro}) \\ Vy^t = V^t_{wheel} \sin(θ^0 + θ^t_{gyro}) \end{cases}$$ Constraint condition 1

$$Vz^t = 0$$ Constraint condition 2

$$Cbv^t = Cbv^0 + At$$ Constraint condition 3

It may be unnecessary to use all the three constraint conditions as constraint conditions. Only one of the vehicle speed data, the amount of azimuth angle change, and the change of the clock drift Cbv over time may be used as a constraint condition. Alternatively, a suitable combination of these values may be used as constraint conditions.

When only the amount of azimuth angle change is used as a constraint condition, $V^t_{wheel}$, $θ^0$, and $Cbv^t$ are unknown parameters in expression (1). Thus, the number of unknown parameters at all times of time-series data is "the number of times ×2+1".

When only the change of the clock drift Cbv over time is used as a constraint condition, $V^t_{wheel}$, $θ^0$, $θ^t_{gyro}$, $Cbv^0$, and A are unknown parameters in expression (1). Thus, the number of unknown parameters at all times of time-series data is "number of times ×2+3".

When only the change of the clock drift Cbv over time and the vehicle speed data are used as constraint conditions, $θ^0$, $θ^t_{gyro}$, $Cbv^0$, and A are unknown parameters in expression (1). Thus, the number of unknown parameters at all times of time-series data is "number of times ×1+3".

Second Modification

In the above-described embodiment, the moving object is a car. The moving object may be other than a car.

What is claimed is:

1. An azimuth estimation device disposed at a moving object and successively estimating an azimuth to which the moving object moves, the azimuth estimation device comprising:
   a satellite data acquisition unit configured to acquire, on a time-series basis, Doppler shift frequencies of navigation signals received by a GNSS receiver;
   a sensor data acquisition unit configured to acquire, on the time-series basis, a yaw rate of the moving object from a yaw rate sensor disposed at the moving object and a speed of the moving object from a speed sensor disposed at the moving object;
   a Doppler azimuth estimation unit configured to estimate the azimuth of the moving object based on equations for estimating the azimuth of the moving object at different times, the equations formulated based on the Doppler shift frequencies acquired on the time-series basis, the equations including unknown parameters varying each time, the unknown parameters constrained by an amount of azimuth angle change calculated based on the yaw rate;
   a state variable determination unit configured to determine a state variable indicating reliability of an azimuth angle, the state variable increasing according to
     an elapsed time having elapsed from updating a reference azimuth to which the amount of azimuth angle change is added in autonomous navigation, and the speed of the moving object;
a threshold selection unit configured to select, from a plurality of evaluation parameter threshold groups for determining whether to adopt the azimuth estimated by the Doppler azimuth estimation unit as an updated value for updating the reference azimuth, one of the evaluation parameter threshold groups relatively easily satisfying an adopting condition of adopting the azimuth estimated by the Doppler azimuth estimation unit for a lower reliability of the azimuth angle, in response to the state variable determined by the state variable determination unit being a value indicating that the reliability of the azimuth angle is lower;
an evaluation parameter calculation unit configured to calculate a plurality of evaluation parameters for evaluating reliability of the azimuth based on the Doppler shift frequencies, in response to the Doppler azimuth estimation unit estimating the azimuth; and
an adopting determination unit configured to
compare the plurality of evaluation parameters with the evaluation parameter threshold group selected by the threshold selection unit, and
determine adoption of the azimuth estimated by the Doppler azimuth estimation unit as the updated value for updating the reference azimuth, in response to determining that the adopting condition is satisfied.

2. An azimuth estimation device disposed at a moving object and successively estimating an azimuth to which the moving object moves, the azimuth estimation device comprising:
a satellite data acquisition unit configured to acquire, on a time-series basis, Doppler shift frequencies of navigation signals received by a GNSS receiver;
a sensor data acquisition unit configured to
acquire, on the time-series basis, magnitude of speed of the moving object from a speed sensor disposed at the moving object, and
acquire, on the time-series basis, a yaw rate of the moving object from a yaw rate sensor disposed at the moving object;
a Doppler azimuth estimation unit configured to estimate the azimuth of the moving object based on equations for estimating the azimuth of the moving object at different times, the equations formulated based on the Doppler shift frequencies acquired on the time-series basis, the equations including unknown parameters varying each time, the unknown parameters constrained by a magnitude of the speed of the moving object and linearization of change in a clock drift over time;
a state variable determination unit configured to determine a state variable indicating reliability of an azimuth angle, the state variable increasing according to
an elapsed time having elapsed from updating a reference azimuth to which an amount of azimuth angle change calculated based on the yaw rate is added in autonomous navigation, and
the speed of the moving object;
a threshold selection unit configured to select, from a plurality of evaluation parameter threshold groups for determining whether to adopt the azimuth estimated by the Doppler azimuth estimation unit as an updated value for updating the reference azimuth, one of the evaluation parameter threshold groups relatively easily satisfying an adopting condition of adopting the azimuth estimated by the Doppler azimuth estimation unit for a lower reliability of the azimuth angle, in response to the state variable determined by the state variable determination unit being a value indicating that the reliability of the azimuth angle is lower;
an evaluation parameter calculation unit configured to calculate a plurality of evaluation parameters for evaluating reliability of the azimuth based on the Doppler shift frequencies, in response to the Doppler azimuth estimation unit estimating the azimuth; and
an adopting determination unit configured to
compare the plurality of evaluation parameters with the evaluation parameter threshold group selected by the threshold selection unit, and
determine adoption of the azimuth estimated by the Doppler azimuth estimation unit as the updated value for updating the reference azimuth, in response to determining that the adopting condition is satisfied.

3. The azimuth estimation device according to claim 1, wherein the state variable increases with an increasing amount along with an increase in the elapsed time, and
wherein the increasing amount decreases in a situation where the moving object has a higher speed than the moving object with a lower speed.

4. The azimuth estimation device according to claim 3, further comprising:
a reliability class determination unit configured to determine an azimuth reliability class based on the state variable determined by the state variable determination unit,
wherein the threshold selection unit configured to
select one of the evaluation parameter threshold groups based on the azimuth reliability class determined by the reliability class determination unit and a speed class, and
select one of the evaluation parameter threshold groups allowing the adopting condition to be satisfied for the lower reliability of the azimuth angle, in response to that the azimuth reliability class indicates the reliability of the azimuth angle is lower and the speed class is a class of a lower speed.

5. The azimuth estimation device according to claim 4, wherein the reliability class determination unit sets the azimuth reliability class to a highest reliability class among the azimuth reliability class, in response to that the Doppler azimuth estimation unit estimates the azimuth for a predetermined time or longer.

6. The azimuth estimation device according to claim 1, wherein the state variable determination unit configured to
set an initial value of the state variable subsequent to a power supply turning on the azimuth estimation device to a previous end value, the previous end value being a value of the state variable at a previous occurrence of the power supply turning off the azimuth estimation device, and
set the initial value of the state variable to a predetermined initial value, in response to that the previous end value is absent.

7. The azimuth estimation device according to claim 4, wherein the speed class includes one or more speed ranges of the moving object.

8. An azimuth estimation device comprising:
a computer disposed at a moving object, the computer configured to:
acquire, on a time-series basis, Doppler shift frequencies of navigation signals received by a GNSS receiver;

acquire, on the time-series basis, a yaw rate of the moving object from a yaw rate sensor disposed at the moving object and a speed of the moving object from a speed sensor disposed at the moving object;

estimate an azimuth of the moving object based on equations for estimating the azimuth of the moving object at different times, the equations formulated based on the Doppler shift frequencies acquired on the time-series basis, the equations including unknown parameters varying each time, the unknown parameters constrained by an amount of azimuth angle change calculated based on the yaw rate;

determine a state variable indicating reliability of an azimuth angle, the state variable increasing according to
- an elapsed time having elapsed from updating a reference azimuth to which the amount of azimuth angle change is added in autonomous navigation, and
- the speed of the moving object;

select, from a plurality of evaluation parameter threshold groups for determining whether to adopt the azimuth estimated by the computer as an updated value for updating the reference azimuth, one of the evaluation parameter threshold groups relatively easily satisfying an adopting condition of adopting the azimuth estimated by the computer as compared with other of the evaluation parameter threshold groups, in response to the state variable being a value indicating the azimuth angle having lower reliability;

calculate a plurality of evaluation parameters for evaluating reliability of the azimuth based on the Doppler shift frequencies, in response to estimating the azimuth;

compare the plurality of evaluation parameters with the evaluation parameter threshold group selected from the plurality of evaluation parameter threshold groups; and determine adoption of the azimuth estimated by the computer as the updated value for updating the reference azimuth, in response to determining the adopting condition is satisfied.

\* \* \* \* \*